Patented Feb. 2, 1943

2,309,718

UNITED STATES PATENT OFFICE 2,309,718

METHOD OF PREPARING HIGH BOILING HYDROCARBONS

Carlisle M. Thacker, Toledo, Ohio, assignor to The Pure Oil Company, Chicago, Ill., a corporation of Ohio No Drawing. Application December 1, 1937, Serial No. 177,411

26 Claims. (Cl. 196—10)

This invention relates to the method for converting paraffinic hydrocarbon gases to organic sulfur compounds; to a method for preparing high boiling hydrocarbons from organic sulfur compounds; and to the method of converting low boiling hydrocarbons, particularly low boiling paraffinic hydrocarbons by means of sulfur oxidation into higher boiling hydrocarbons.

Various methods have been proposed for converting gaseous hydrocarbons such as methane, ethane, propane and butane into higher boiling hydrocarbons. Such methods include thermolytic cracking and polymerization, catalytic cracking and polymerization, and the application of electricity in combination with heat treatment. These various methods have been fairly successful in connection with the treatment of butane and propane. The conversion of ethane, however, is still in the experimental stage, while methane yields to heat treatment with or without catalysts only at extremely high temperatures.

I have discovered that methane can be converted into alkyl sulfur compounds by subjecting the methane in the presence of sulfur or sulfur yielding compounds to high temperatures in the presence of suitable catalysts.

I have further discovered that alkyl sulfur compounds can be converted into high boiling hydrocarbons by subjecting the sulfur compounds to high temperatures in the presence of catalysts.

In carrying out my invention I may either start with low boiling sulfur compounds which are found in large quantities in refinery gases, or I may start with methane, ethane, propane or butane, or mixtures thereof. If the starting material is hydrocarbon gas, it is heated and mixed with sulfur vapors and the mixture fed into a reactor where the mixed gas and sulfur vapor is contacted with a catalyst. As catalysts suitable for effecting the conversion of the hydrocarbons to sulfur compounds, I may use oxides or sulfides of vanadium, manganese, copper, iron, cobalt, nickel, chromium, molybdenum. These compounds may be used alone or supported on such materials as silica gel, alumina gel, pumice, or charcoal. The reactor is preferably maintained at a temperature of approximately 400°–700° C. and under a pressure of from 1–125 atmospheres. Elevated pressures influence the reaction in the desired direction. Typical reactions which may take place between the gas and the sulfur are as follows:

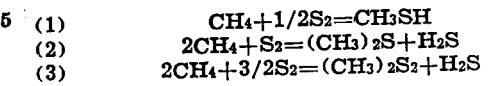

(1)        $CH_4 + 1/2 S_2 = CH_3SH$
(2)        $2CH_4 + S_2 = (CH_3)_2S + H_2S$
(3)        $2CH_4 + 3/2 S_2 = (CH_3)_2S_2 + H_2S$

The amount of sulfur charged with the gas is preferably not in excess of that necessary to stoichiometrically react with the gas to form the mercaptan. The reactor as well as the remainder of the apparatus may be fabricated from stainless steel, chrome, molybdenum steel, silica, quartz, or other material which is resistant to sulfur corrosion; or the apparatus may be made out of non-resistant steel lined with silica or quartz.

As shown by the equations given above, the sulfur reacts with the gases to form mercaptans, thio-ethers and disulfides. The reaction products may be cooled and the organic sulfur compounds separated therefrom by absorption in naphtha and subsequently separated therefrom by fractionation; or the sulfur compounds may be removed by reaction with a metallic salt such as mercuric chloride and recovered therefrom by treatment with dilute acid; or the sulfur compound may be separated by fractionation. Hydrogen sulfide may be separated from the organic sulfur compound by scrubbing with water prior to separation of the organic sulfur compounds from the remaining gases. The unreacted gases may be recycled for further reaction. Selenium may be substituted for sulfur when reaction temperature is sufficiently high to vaporize selenium. In place of sulfur, compounds thereof may be used, such as sulfur chloride, which readily give up free sulfur.

In order to convert the organic sulfur compounds to higher boiling hydrocarbons, the compounds are heated in order to vaporize them and charged to a reaction zone maintained at a temperature in excess of 300° C., but not substantially in excess of 700° C. In the reactor the sulfur compounds are contacted with a hydrogen sulfide splitting-off catalyst such as copper sulfide, cadmium sulfide, silica gel, activated alumina, or chromium oxide gel, or mixtures thereof. If copper or cadmium sulfide is used as a catalyst, it is preferably used supported on a carirer such as silica gel or activated alumina, although inert carriers such as pumice may be used.

In the presence of the catalyst the sulfur compounds may undergo the following reactions:

(1) $2C_2H_5SH = C_4H_8 + 2H_2S$
(2) $6CH_3SH = C_6H_6 + 6H_2S + 3H_2$
(3) $C_2H_6 + CH_3SH = C_3H_8 + H_2S$
(4) $2CH_3SH = C_2H_4 + 2H_2S$
(5) $3/2(C_2H_5)_2S = C_6H_6 + 3/2H_2S + 3H_2$

Reaction compounds such as butane, propane and ethylene may be subjected to well known thermolytic or catalytic cracking and polymerization processes in order to convert them to higher boiling compounds within the gasoline boiling range.

The unreacted sulfur compounds in the reaction gases may be separated therefrom by any one of the several methods mentioned in connection with the preparation of sulfur compounds from methane and the sulfur compounds recycled for further reaction.

The apparatus in which the process is carried out may be of any conventional type consisting of a heating coil and reaction chamber with cooling and fractionating means connected to the reaction chamber. The apparatus should be fabricated out of sulfur resistant alloys such as those mentioned in the preparation of sulfur compounds from methane.

What I claim is:

1. Method for converting paraffinic gases into higher boiling hydrocarbons which comprises contacting said gases at elevated temperatures in the presence of sulfur with an oxidation catalyst, separating the resulting organic sulfur compounds from the remaining reaction products, and contacting the organic sulfur compounds at elevated temperatures with a catalyst capable of splitting off hydrogen sulfide from the organic sulfur compounds.

2. Method in accordance with claim 1 in which the conversion of paraffinic gases into organic sulfur compounds is effected at a temperature of 400°–700° C. and the conversion of sulfur compounds to higher boiling hydrocarbons is effected at 300°–700° C.

3. In the conversion of low boiling paraffinic hydrocarbons into higher boiling hydrocarbons, the steps of converting said low boiling hydrocarbons into alkyl sulfur compounds, separating the alkyl sulfur compounds from the remaining reaction products, and then converting the separated alkyl sulfur compounds to higher boiling hydrocarbons.

4. In the conversion of low boiling paraffinic hydrocarbons into higher boiling hydrocarbons, the steps of contacting a mixture of said hydrocarbons and a substance selected from the group consisting of sulfur, selenium and sulfur or selenium yielding compounds at elevated temperatures in the presence of an oxidation catalyst, separating the organic sulfur or selenium reaction products from the reaction mixture, and contacting the separated sulfur or selenium reaction products with a hydrogen sulfide and hydrogen selenide splitting-off catalyst, at elevated temperature.

5. Method in accordance with claim 4 in which the first reaction step is carried out at temperatures between 400° and 700° C., and the second reaction step is carried out at temperatures between 300° and 700° C.

6. In the process of preparing higher boiling hydrocarbons from lower boiling paraffinic hydrocarbons, the step of converting alkyl sulfur compounds of low boiling hydrocarbons resulting from reaction of said lower boiling paraffinic hydrocarbons with sulfur yielding material at elevated temperatures in the presence of an oxidation catalyst into higher boiling hydrocarbons, by contacting said sulfur compounds at reaction temperatures with a catalyst capable of splitting off hydrogen sulfide.

7. Step in accordance with claim 6 in which the reaction temperature is in excess of 300° C. but not substantially in excess of 700° C.

8. A process of preparing hydrocarbons from compounds selected from the group consisting of organic sulfur and selenium compounds prepared by reacting low boiling paraffinic hydrocarbon with material selected from the group consisting of sulfur, selenium and sulfur or selenium yielding compounds at elevated temperature in the presence of an oxidation catalyst comprising contacting the first mentioned compounds at elevated temperature with catalyst capable of splitting off hydrogen sulfide and hydrogen selenide.

9. A process in accordance with claim 8 in which said last mentioned temperature is in excess of 300° C. but not substantially in excess of 700° C.

10. A process of preparing hydrocarbons from alkyl sulfur compounds prepared by reacting low boiling paraffinic hydrocarbons with sulfur or sulfur-yielding compound at elevated temperature in the presence of an oxidation catalyst comprising contacting said alkyl sulfur compounds at elevated temperature with catalyst capable of splitting off hydrogen sulfide.

11. A process in accordance with claim 10 in which the low boiling hydrocarbons are normally gaseous, paraffinic hydrocarbons.

12. A process in accordance with claim 10 in which the low boiling hydrocarbon is methane.

13. In a method for converting paraffinic gases into higher boiling hydrocarbons, the steps of contacting said gas with sulfur-yielding material at temperatures between 400° and 700° C. in the presence of an oxidation catalyst, and contacting the resulting organic sulfur compounds at temperatures between 300° and 700° C. with a hydrogen sulfide splitting off catalyst.

14. Method in accordance with claim 13 in which the hydrogen sulfide splitting off catalyst comprises silica gel.

15. Method in accordance with claim 13 in which the hydrogen sulfide splitting off catalyst comprises activated alumina.

16. Method in accordance with claim 13 in which the hydrogen sulfide splitting off catalyst comprises chromium oxide gel.

17. A method in accordance with claim 13 in which the oxidation catalyst is selected from the group consisting of vanadium, manganese, copper, iron, cobalt, nickel, chromium and molybdenum sulfides.

18. A method in accordance with claim 13 in which the oxidation catalyst is selected from the group consisting of vanadium, manganese, copper, iron, cobalt, nickel, chromium and molybdenum sulfides, and the hydrogen sulfide splitting off catalyst comprises silica gel.

19. A method in accordance with claim 13 in which the oxidation catalyst is selected from the group consisting of vanadium, manganese, copper, iron, cobalt, nickel, chromium and molybdenum sulfides, and the hydrogen sulfide splitting off catalyst comprises activated alumina.

20. A method in accordance with claim 13 in which the oxidation catalyst is selected from the group consisting of vanadium, manganese, copper, iron, cobalt, nickel, chromium and molybdenum sulfides, and the hydrogen sulfide splitting off catalyst comprises chromium oxide gel.

21. Step in accordance with claim 6 in which the hydrogen sulfide splitting-off catalyst is silica gel.

22. Step in accordance with claim 6 in which the hydrogen sulfide splitting-off catalyst is activated alumina.

23. Step in accordance with claim 6 in which the hydrogen sulfide splitting-off catalyst is chromium oxide gel.

24. A process in accordance with claim 8 in which the last-mentioned catalyst is silica gel.

25. A process in accordance with claim 8 in which the last-mentioned catalyst is activated alumina.

26. A process in accordance with claim 8 in which the last-mentioned catalyst is chromium oxide gel.

CARLISLE M. THACKER.